US009111374B2

(12) United States Patent
Shiraga

(10) Patent No.: US 9,111,374 B2
(45) Date of Patent: Aug. 18, 2015

(54) MOBILE TERMINAL, METHOD FOR CONTROLLING THE SAME, AND NON-TRANSITORY STORAGE MEDIUM STORING PROGRAM TO BE EXECUTED BY MOBILE TERMINAL

(71) Applicant: BROTHER KOGYO KABUSHIKI KAISHA, Nagoya-shi, Aichi-ken (JP)

(72) Inventor: Naoto Shiraga, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 378 days.

(21) Appl. No.: 13/687,978

(22) Filed: Nov. 28, 2012

(65) Prior Publication Data
US 2013/0139051 A1 May 30, 2013

(30) Foreign Application Priority Data

Nov. 29, 2011 (JP) ................................. 2011-260420
Nov. 29, 2011 (JP) ................................. 2011-260421

(51) Int. Cl.
*G06F 17/00* (2006.01)
*G06T 11/00* (2006.01)
*G06F 17/21* (2006.01)

(52) U.S. Cl.
CPC .............. *G06T 11/00* (2013.01); *G06F 17/217* (2013.01)

(58) Field of Classification Search
CPC .... G06F 17/217; G06F 17/211; G06F 3/0485
See application file for complete search history.

(56) References Cited

U.S. PATENT DOCUMENTS

| 5,442,464 | A  | * | 8/1995 | Ito ................................. 358/482 |
| 5,900,002 | A  | * | 5/1999 | Bottomly ...................... 715/209 |
| 6,202,073 | B1 | * | 3/2001 | Takahashi ..................... 715/204 |
| 8,189,225 | B1 | * | 5/2012 | Lo et al. ........................ 358/1.15 |
| 8,301,999 | B2 | * | 10/2012 | Olson ........................... 715/246 |
| 8,854,668 | B2 | * | 10/2014 | Buckley et al. ............... 358/1.15 |
| 2005/0093891 | A1 | * | 5/2005 | Cooper ......................... 345/649 |
| 2006/0012832 | A1 | * | 1/2006 | Kayanuma .................... 358/296 |
| 2006/0256033 | A1 | * | 11/2006 | Chan et al. .................... 345/1.1 |
| 2008/0177994 | A1 | * | 7/2008 | Mayer ............................... 713/2 |
| 2008/0230386 | A1 | * | 9/2008 | Srinivasan et al. ............ 204/450 |
| 2009/0080001 | A1 | * | 3/2009 | Ueda et al. .................... 358/1.5 |
| 2009/0116049 | A1 | * | 5/2009 | Takenuki et al. .............. 358/1.9 |
| 2009/0274391 | A1 | * | 11/2009 | Arcas et al. ................... 382/285 |
| 2010/0069008 | A1 | * | 3/2010 | Oshima et al. .............. 455/41.3 |

(Continued)

FOREIGN PATENT DOCUMENTS

JP 2006-027017 A 2/2006
JP 2006-245747 A 9/2006

*Primary Examiner* — Laurie Ries
(74) *Attorney, Agent, or Firm* — Merchant & Gould PC

(57) ABSTRACT

A non-transitory storage medium storing a program readable by a computer of a mobile terminal including: a storage configured to store an image data set containing image data having order numbers; and a display. The program causes the computer to function as a display controller that controls displays a first image based on image data that is a selected one of the image data. The display controller, where images respectively based on the image data have a two-page-spread relationship, displays the first image and a second image consecutive to the first image in a two-page spread layout in which the first image and the second image are arranged respectively on one and the other of the right and left pages; and where the images do not have the two-page-spread relationship, displays the first image in a layout that differs from the two-page spread layout.

12 Claims, 12 Drawing Sheets

(56) References Cited

U.S. PATENT DOCUMENTS

2011/0016408 A1* 1/2011 Grosz et al. .................. 715/745
2011/0243637 A1* 10/2011 Nakamura et al. ............ 400/583
2012/0105464 A1* 5/2012 Franceus ...................... 345/581
2012/0250082 A1* 10/2012 Mori ............................ 358/1.15
2012/0280998 A1* 11/2012 Nordlund ..................... 345/428

* cited by examiner

MOBILE TERMINAL, METHOD FOR CONTROLLING THE SAME, AND NON-TRANSITORY STORAGE MEDIUM STORING PROGRAM TO BE EXECUTED BY MOBILE TERMINAL

CROSS REFERENCE TO RELATED APPLICATION

The present application claims priority from Japanese Patent Application Nos. 2011-260420 filed on Nov. 29, 2011, and 2011-260421 filed on Nov. 29, 2011, the disclosures of which are herein incorporated by reference in its entirety.

BACKGROUND OF THE INVENTION

1. Field of the Invention

The present invention relates to a mobile terminal capable of displaying various images, a method for controlling the mobile terminal, and a non-transitory storage medium storing a program to be executed by the mobile terminal.

2. Description of the Related Art

There is known a technique for controlling display of a liquid crystal display, which is abbreviated to an LCD, such that an up and down direction of an image displayed on the LCD coincides with a direction of gravity. This display control is executed based on information indicative of an orientation of an image and an orientation of a main body of a mobile phone, which information is attached to image data upon reproduction of the image. In this technique, the image displayed on the LCD is rotated as appropriate depending upon an operating state and the orientation of the mobile phone. Thus, a user can view or recognize the image without need to change the orientation of the phone main body depending upon the orientation of the image at the time of image taking.

Also, there is known another technique in which bound printed materials constituted by a plurality of pages are scanned and printed in a binding manner. In this technique, data representative of the scanned bound printed materials are displayed on a LCD in a two-page spread layout in which right and left pages upon opening of the bound printed materials are arranged next to each other.

SUMMARY OF THE INVENTION

Among the image data, however, there are image data representative of images other than the bound printed materials, but the above-described technique provides no method for how to display the image data representative of images other than the bound printed materials. In addition, the above-described technique provides no method for how to display a plurality of images based on a plurality of image data depending upon the orientation of the LCD. This invention has been developed to provide a technique for preferably displaying a plurality of images based on a plurality of image data.

The present invention provides a non-transitory storage medium storing a program to be executed by a computer of a mobile terminal comprising: a storage configured to store an image data set containing a plurality of image data to which order numbers are respectively assigned in order, and a display configured to display thereon at least one image of a plurality of images respectively based on the plurality of image data, wherein the program is designed to cause the computer to function as a display controller configured to control the display to display a first image based on image data that is a selected one of the plurality of image data contained in the image data set, and wherein the display controller is configured to: where a plurality of images respectively based on the plurality of image data contained in the image data set have a two-page-spread relationship in which consecutive two of the plurality of images constitute a pair of right and left pages, control the display to display the first image and a second image consecutive to the first image in a two-page spread layout in which the first image and the second image are arranged respectively on one and the other of the right and left pages; and where the plurality of images respectively based on the plurality of image data contained in the image data set do not have the two-page-spread relationship, control the display to display the first image in a layout that differs from the two-page spread layout.

The present invention also provides a non-transitory storage medium storing a program to be executed by a computer of a mobile terminal comprising: a sensor-information output unit configured to output sensor information indicative of an orientation of the mobile terminal; a storage configured to store an image data set containing a plurality of image data to which order numbers are respectively assigned in order; and a display having short sides and long sides and configured to display thereon at least one image of a plurality of images respectively based on the plurality of image data, wherein the program is designed to cause the computer to function as a display controller configured to control the display to display a first image based on image data that is a selected one of the plurality of image data contained in the image data set, wherein each of the plurality of images respectively based on the plurality of image data is a portrait image, and wherein the display controller is configured to where the sensor information indicates that a direction in which the long sides of the display extend is nearer to a horizontal direction than to a vertical direction, control the display to display the first image and a second image consecutive to the first image; and where the sensor information indicates that a direction in which the short sides of the display extend is nearer to the horizontal direction than to the vertical direction, control the display to display the first image.

The present invention also provides a method for controlling a mobile terminal comprising: a storage configured to store an image data set containing a plurality of image data to which order numbers are respectively assigned in order, and a display configured to display thereon at least one image of a plurality of images respectively based on the plurality of image data, wherein the method comprises a display control step of controlling the display to display a first image based on image data that is a selected one of the plurality of image data contained in the image data set, and wherein the display control step comprises: where a plurality of images respectively based on the plurality of image data contained in the image data set have a two-page-spread relationship in which consecutive two of the plurality of images constitute a pair of right and left pages, controlling the display to display the first image and a second image consecutive to the first image in a two-page spread layout in which the first image and the second image are arranged respectively on one and the other of the right and left pages; and where the plurality of images respectively based on the plurality of image data contained in the image data set do not have the two-page-spread relationship, controlling the display to display the first image in a layout that differs from the two-page spread layout.

The present invention also provides a mobile terminal, comprising: a storage configured to store an image data set containing a plurality of image data to which order numbers are respectively assigned in order; a display configured to display thereon at least one image of a plurality of images respectively based on the plurality of image data and a display controller configured to control the display to display a first image based on image data that is a selected one of the plurality of image data contained in the image data set, wherein the display controller is configured to: where a plurality of images respectively based on the plurality of image data contained in the image data set have a two-page-spread relationship in which consecutive two of the plurality of images constitute a pair of right and left pages, control the display to display the first image and a second image consecutive to the first image in a two-page spread layout in which the first image and the second image are arranged respectively on one and the other of the right and left pages; and where the plurality of images respectively based on the plurality of image data contained in the image data set do not have the two-page-spread relationship, control the display to display the first image in a layout that differs from the two-page spread layout.

The present invention also provides a method for controlling a mobile terminal comprising: a sensor-information output unit configured to output sensor information indicative of an orientation of the mobile terminal; a storage configured to store an image data set containing a plurality of image data to which order numbers are respectively assigned in order; and a display having short sides and long sides and configured to display thereon at least one image of a plurality of images respectively based on the plurality of image data, wherein the method comprises a display control step of controlling the display to display a first image based on image data that is a selected one of the plurality of image data contained in the image data set, wherein each of the plurality of images respectively based on the plurality of image data is a portrait image, and wherein the display control step comprises: where the sensor information indicates that a direction in which the long sides of the display extend is nearer to a horizontal direction than to a vertical direction, controlling the display to display the first image and a second image consecutive to the first image; and where the sensor information indicates that a direction in which the short sides of the display extend is nearer to the horizontal direction than to the vertical direction, controlling the display to display the first image.

The present invention also provides a mobile terminal, comprising: a sensor-information output unit configured to output sensor information indicative of an orientation of the mobile terminal; a storage configured to store an image data set containing a plurality of image data to which order numbers are respectively assigned in order; a display having short sides and long sides and configured to display thereon at least one image of a plurality of images respectively based on the plurality of image data; and a display controller configured to control the display to display a first image based on image data that is a selected one of the plurality of image data contained in the image data set, wherein each of the plurality of images respectively based on the plurality of image data is a portrait image, and wherein the display controller is configured to: where the sensor information indicates that a direction in which the long sides of the display extend is nearer to a horizontal direction than to a vertical direction, control the display to display the first image and a second image consecutive to the first image; and where the sensor information indicates that a direction in which the short sides of the display extend is nearer to the horizontal direction than to the vertical direction, control the display to display the first image.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which.

DETAILED DESCRIPTION OF THE EMBODIMENTS

First Embodiment

Figure 1:
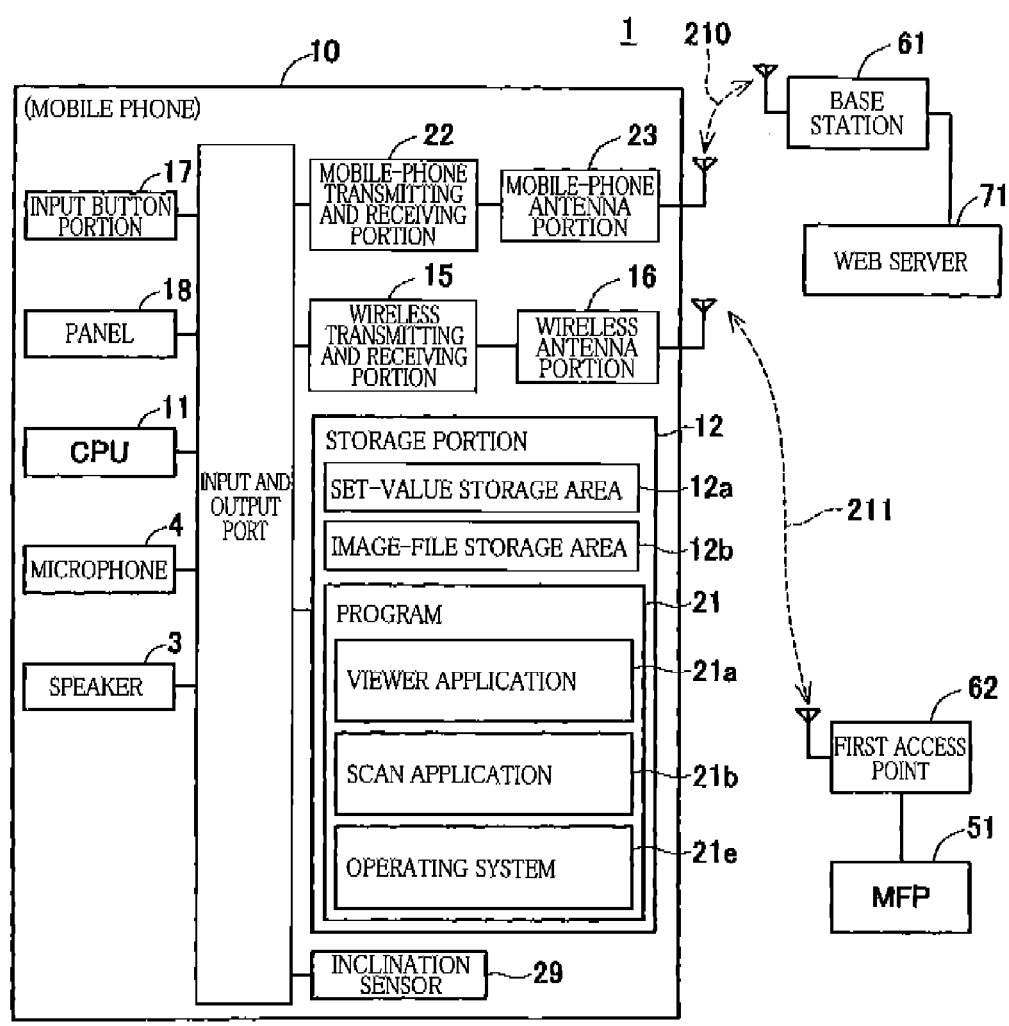
FIG. 1 is a block diagram showing a communication system 1.

Hereinafter, there will be described embodiments of the present invention by reference to the drawings. FIG. 1 shows a communication system 1 in a first embodiment of the present invention. The communication system 1 includes a mobile phone 10, a multi-function peripheral (hereinafter referred to as "MFP") 51, a first access point 62, a web server 71, and a base station 61. Each of the mobile phone 10 and the MFP 51 can serve as a well-known wireless-LAN terminal device. The MFP 51 has various functions such as a printing function, a scanning function, a copying function, and a facsimile function. The first access point 62 can serve as a well-known wireless-LAN access point. The web server 71 is a device which delivers its functions and data to client devices through a network.

It is noted that the mobile phone 10 and the first access point 62 can perform wireless communication 211, i.e., data communication using radio waves, by using a wireless LAN operating in an infrastructure mode which is a mode in which a plurality of wireless LAN devices or terminals perform data communication via access points. That is, when the mobile phone 10 accesses the first access point 62, and the wireless communication 211 becomes available in the infrastructure mode, the mobile phone 10 can perform data communication with the MFP 51 via the first access point 62. It is noted that types of the wireless LAN include communication methods according to IEEE802.11a/b/g/n standards, for example.

Here, a structure of the mobile phone 10 will be explained. As shown in FIG. 1, the mobile phone 10 mainly includes a central processing unit (hereinafter referred to as "CPU") 11, a storage portion 12, a wireless transmitting and receiving portion 15, a wireless antenna portion 16, an input button portion 17, a panel 18, a mobile-phone transmitting and receiving portion 22, a mobile-phone antenna portion 23, and an inclination sensor (also called a gyroscope) 29. The mobile phone 10 also includes a speaker 3 and a microphone 4 for a phone conversation and a voice input.

The CPU 11 executes various processings according to programs 21 stored in the storage portion 12. Hereinafter, the CPU 11 that executes programs such as a viewer application 21a and an operating system 21e may be simply referred to as a name of the program. For example, wording "the viewer application 21a executes" may mean "the CPU 11 that executes the viewer application 21a executes". It is noted that the storage portion 12 is constituted by various components such as a random access memory (hereinafter referred to as "RAM"), a read only memory (hereinafter referred to as "ROM"), a flash memory, a hard disc (hereinafter referred to as "HDD"), and a buffer of the CPU 11. The wireless transmitting and receiving portion 15 performs the wireless communication 211 in the infrastructure mode via the wireless antenna portion 16. The mobile-phone transmitting and receiving portion 22 performs wireless communication 210 with the base station 61 via the mobile-phone antenna portion 23 according to a communication method of the mobile phone. The wireless transmitting and receiving portion 15, the mobile-phone transmitting and receiving portion 22, and the like transmit and receive digital signals constituting various data.

The storage portion 12 stores the programs 21 therein. The programs 21 include the viewer application 21a, a scan application 21b, and the operating system 21e. The viewer application 21a is an application which causes the CPU 11 to execute a processing for displaying on the panel 18 an image or images based on image data stored in an image-file storage area 12b. The scan application 21b is an application which causes the MFP 51 to execute a scanning processing for creating an image file and/or which causes the CPU 11 to execute a processing for receiving from the MFP 51 the image file created by the MFP 51.

The operating system 21e is a program which provides basic functions commonly used by the viewer application 21a and the scan application 21b. The operating system 21e includes: a program for causing the mobile-phone transmitting and receiving portion 22 to perform the communication; and a program for causing the wireless transmitting and receiving portion 15 to perform the wireless communication 211. The operating system 21e is also a program which provides an application programming interface (hereinafter referred to as "API") for each program to command hardware or to obtain information that is calculated by the inclination sensor 29 and other components.

The storage portion 12 includes a set-value storage area 12a and the image-file storage area 12b. The set-value storage area 12a stores, for example, a file-type flag, a selected-image page number, and a display setting which will be described below. The file-type flag is information which represents a file type of an image file to be displayed, namely, a to-be-displayed image file or a display target image file. Examples of the file type include a book file which contains a plurality of image data respectively representative of a plurality of images. Every consecutive two of some or all of these images constitute a pair of right and left pages, in other words, these images have a two-page-spread relationship. The selected-image page number is a page number which indicates a page number, i.e., an order number, of an image to be displayed as a selected image G1 among the plurality of images respectively based on the plurality of image data contained in the image file. It is noted that page numbers are sequentially assigned to the respective images.

The display setting is a setting for a layout of the image(s) displayed on the panel 18. The display setting includes a "one page layout", a "right-binding two-page-spread layout", and a "left-binding two-page-spread layout". The one page layout is a layout in which a single image is displayed on the panel 18. The right-binding two-page-spread layout is a layout in which, when two consecutive images are displayed on the respective right and left pages, the page number of the image increases from the right page to the left page, that is, a page number of the right image is smaller than that of the left image. The right-binding two-page-spread layout is mainly used when the panel 18 displays an image that contains texts written vertically. The left-binding two-page-spread layout is an layout in which, when two consecutive images are displayed on the respective right and left pages, the page number of the image increases from the left page to the right page, that is, the page number of the left image is smaller than that of the right image. The left-binding two-page-spread layout is mainly used when the panel 18 displays an image that contains texts written horizontally.

The image-file storage area 12b is an area which stores a plurality of image files. Each of the image files contains a plurality of image data. Each of the plurality of image data is used for displaying a corresponding one of different images. In the following explanation, the images based on the image data contained in the image file may be described as images contained in the image file.

Examples of the image file include a file that is obtained by scanning printed materials in the form of a bound book or document. In this case, images obtained by scanning pages of the book are the plurality of images contained in the image file. An order of the page numbers of the plurality of images contained in the image file corresponds to that of page numbers of the book.

Each of the plurality of images contained in the image file may be a portrait image. The portrait image is an image that is arranged in an orientation in which the user facing a display surface of the panel 18 can properly view or read the image where the panel 18 having a rectangular display region is positioned such that its short sides extend in a horizontal direction and its long sides extend in a direction perpendicular to the horizontal direction. This state of the mobile phone 10 is called a vertical orientation. On the other hand, a landscape image, which differs from the portrait image in its orientation, is an image that is arranged in an orientation in which the user facing the display surface of the panel 18 can properly view or read the image where the panel 18 having the rectangular display region is positioned such that its long sides extend in the horizontal direction and its short sides extend in the direction perpendicular to the horizontal direction. This state of the mobile phone 10 is called a horizontal orientation.

The input button portion 17 is a group of buttons with which the user operates the mobile phone 10. The input button portion 17 is in the form of a touch panel which is designed integrally with the panel 18. The panel 18 displays thereon various functional information of the mobile phone 10. The display surface of the panel 18 is the rectangular display region having the short sides and the long sides. The inclination sensor 29 is a sensor which detects an angular velocity to measure an inclination angle of the mobile phone 10 with respect to a horizontal plane.

The mobile phone 10 is a vertical and horizontal model. The vertical and horizontal model is a model in which the user can operate the mobile phone 10 properly even where the panel 18 is in a vertical orientation or a horizontal orientation.

The vertical orientation of the panel 18 having the rectangular display region is an orientation in which its short sides extend in the horizontal direction and its long sides extend in the direction perpendicular to the horizontal direction. The horizontal orientation of the panel 18 having the rectangular display region is an orientation in which its long sides extend in the horizontal direction and its short sides extend in the direction perpendicular to the horizontal direction. It is noted that, in a case where there are a plurality of image data which represent portrait images, numbers are respectively assigned to the plurality of image data in order. The numbers assigned to the respective image data may be assigned in an order of scanning when the printed materials are scanned or in an order of obtainment when images are obtained by taking with a digital camera or a download through an Internet, for example. Also, the numbers may be numbers that are intentionally assigned by a user of an application of e.g., a PC, to data created by the application. These numbers may be indicated by file names of the respective image data, by headers of the respective image data, or by management data that differs from the image data and contains information about management of the image data.

<Operations of Mobile Phone>

There will be next explained operations of the mobile phone 10 according to the first embodiment with reference to FIGS. 2-5.

<Operations of Scan Application>

Figure 5:
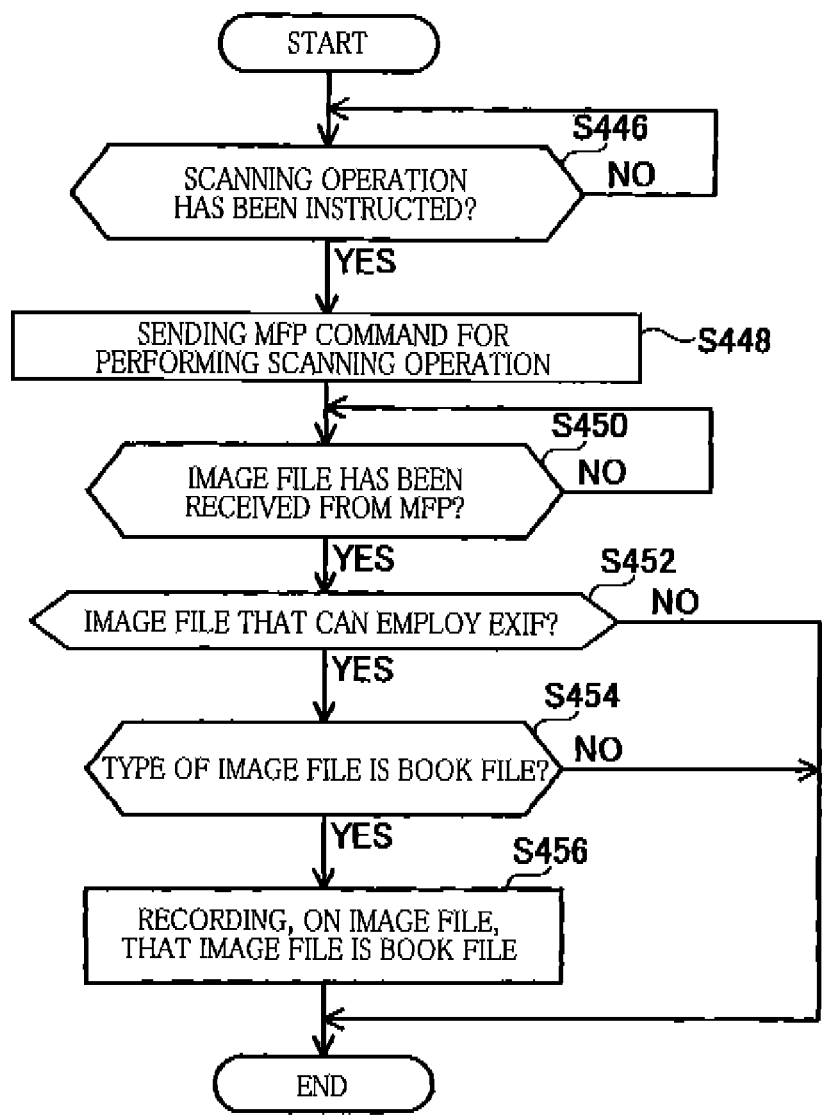
FIG. 5 is a flow chart showing operations of the mobile phone.

There will be explained, with reference to FIG. 5, a processing for obtaining and storing the image file using the scan application 21b. When the user operates the input button portion 17 to activate the scan application 21b, the CPU 11 activates the scan application 21b, and a flow in FIG. 5 begins.

At S446, the CPU 11 judges whether the user has instructed the mobile phone 10 to command the MFP 51 to perform a scanning operation. When the instruction has not been received (S446: NO), this flow repeats S446. When the instruction is received (S446: YES), this flow goes to S448 at which the CPU 11 transmits a command for performing the scanning operation, to the MFP 51 using the wireless communication 211. Upon receipt of the command, the MFP 51 scans a document placed on a document table, not shown, to create an image file.

At S450, the CPU 11 judges whether the mobile phone 10 has received, from the MFP 51, the image file created by the MFP 51. The image file may contain any type of the image data, for example, may contain image data created using JPEG (Joint Photographic Experts Group) compression. When the image file has not received (S450: NO), this flow repeats S450, and when the image file is received (S450: YES), this flow goes to S452.

At S452, the CPU 11 judges whether the image file received is an image file that can employ an exchangeable image file format (hereinafter referred to as "Exif"). The image file that can employ Exif is a file which can contain additional information such as a type of image data and a date and time taken. Where the image file received is not the image file that can employ Exif (S452: NO), this flow ends, and when the image file received is the image file that can employ Exif (S452: YES), this flow goes to S454.

At S454, the CPU 11 judges whether the type of the image file is the book file. At this step, the CPU 11 may judge whether the type of the image file is the book file by judging whether the user has input information that the document to be scanned is a book when the mobile phone 10 at S446 has received the instruction to perform the scanning operation, for example. At S456, the CPU 11 attaches information of this image file being the book file, as the additional information, to the image file that can employ Exif, and this flow ends.

<Operations of Viewer Application>

Figure 2:
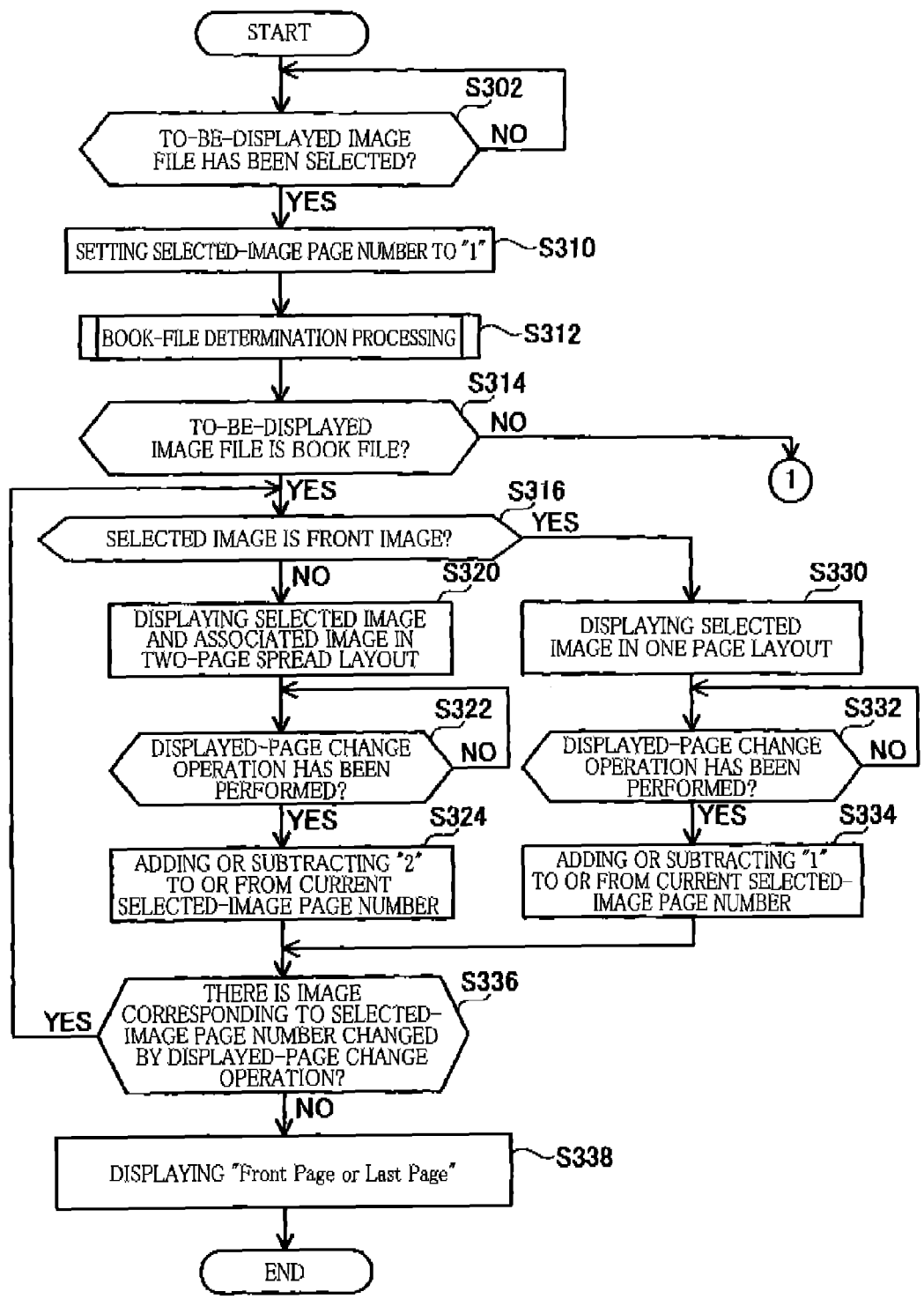
FIG. 2 is a flow chart showing operations of a mobile phone.

There will be next explained, with reference to FIG. 2, a processing using the viewer application 21a for displaying a plurality of images contained in one image file. When the user operates the input button portion 17 to activate the viewer application 21a, the CPU 11 activates the viewer application 21a, and a flow in FIG. 2 begins.

At S302, the CPU 11 judges which of the plurality of image files stored in the image-file storage area 12b has been selected as the to-be-displayed image file. For example, icons representative of the respective image files are displayed on the panel 18, and the CPU 11 judges whether the user has touched any of the icons. When the to-be-displayed image file has not been selected (S302: NO), this flow repeats S302, and when the to-be-displayed image file is selected (S302: YES), this flow goes to S310.

At S310, the CPU 11 sets the selected-image page number to "1". As a result, a front image of the plurality of images contained in the to-be-displayed image file is selected as the selected image G1 that is an image to be displayed.

At S312, the CPU 11 executes a book-file determination processing. Here, the book-file determination processing will be explained with reference to FIG. 4. The book-file determination processing is a processing for judging whether the to-be-displayed image file is the book file.

At S410, the CPU 11 judges whether a format of the to-be-displayed image file is a format for an electronic book. Examples of the format for the electronic book include an EPUB and an XMIDF (ever-eXtending Mobile Document Format). Where the format of the to-be-displayed image file is the format for the electronic book (S410: YES), the CPU 11 determines that the image file is the book file, and the processing goes to S420 at which the CPU 11 sets the file-type flag to the book file. Upon completion of S420, the book-file determination processing ends.

On the other hand, the format of the to-be-displayed image file is not the format for the electronic book (S410: NO), this flow goes to S412 at which the CPU 11 judges whether the to-be-displayed image file contains the additional information according to Exif. Where the to-be-displayed image file does not contain the additional information (S412: NO), this flow goes to S416, and where the to-be-displayed image file contains the additional information (S412: YES), this flow goes to S414. At S414, the CPU 11 reads the additional information contained in the to-be-displayed image file and judges whether the additional information contains the information that the image file is the book file. Where the additional information contains the information that the image file is the book file (S414: YES), the CPU 11 determines that the image file is the book file, and the processing then goes to S420 at which the CPU 11 sets the file-type flag to the book file. Upon completion of S420, the book-file determination processing ends.

On the other hand, where the additional information does not contain the information that the image file is the book file (S414: NO), this flow goes to S416 at which the CPU 11 judges whether a size of the document used for the creation of the images contained in the image file is equal to or smaller than A4 size. The judgment of the size of the document is executed for a front image in the image file, for example. It is noted that where the CPU 11 at S410 judges that the format of the to-be-displayed image file is the format for the electronic book, the CPU 11 judges that the plurality of images contained in the to-be-displayed image file have the two-page-spread relationship in which every consecutive two of some or all of these images constitute a pair of right and left pages. In this case, the CPU 11 sets the file-type flag of the to-be-displayed image file to the book file. In the present embodiment, the images contained in the image file other than the images corresponding to the first and last pages have the two-page-spread relationship.

The judgment of the size of the document may be executed based on a resolution and the number of pixels of each of the images based on the image data, for example. Here, this judgment is explained assuming that the image has "X" pixels along its short sides and "Y" pixels along its long sides and has a resolution of "a" dpi (dots per inch). In this case, a length of the document along its short sides is X/a inches while a length of the document along its long sides is Y/a inches. Meanwhile, a length of the A4 size along its short sides is about 8.27 inches while a length of the A4 size along its long sides is about 11.69 inches. Therefore, the CPU 11 needs to judge whether each of the lengths of the document along its short sides and long sides is shorter than a corresponding one of the lengths of the A4 size along its short sides and long sides. Where the size of the document is equal to or smaller than the A4 size (S416: YES), the plurality of images contained in the image file are judged to have the two-page-spread relationship, and the processing goes to S420 at which the CPU 11 sets the file-type flag to the book file. Upon completion of S420, the book-file determination processing ends. It is noted that the CPU 11 at S414 judges that the to-be-displayed image file contains the additional information according to Exit and the additional information contains the information that the image file is the book file, the CPU 11 judges that the plurality of images contained in the to-be-displayed image file have the two-page-spread relationship. In this case, the CPU 11 sets the file-type flag of the to-be-displayed image file to the book file.

On the other hand, where the size of the document is larger than the A4 size (S416: NO), the CPU 11 judges that the image file is a file that is different from the book file, and this flow goes to S413 at which the CPU 11 sets the file-type flag to "file different from book file". Upon completion of S418, the book-file determination processing ends.

Returning now to the flow in FIG. 2, the CPU 11 at S314 judges whether the to-be-displayed image file is the book file. Specifically, the CPU 10 reads the file-type flag to execute this judgment. Where the to-be-displayed image file is the book file (S314: YES), this flow goes to S316.

At S316, the CPU 11 judges whether the selected image G1 being indicated or selected by the selected-image page number is a front or top image, i.e., a front or top page, in the image file. Where the selected image G1 is not the front image (S316: NO), this flow goes to S320.

Figure 11:
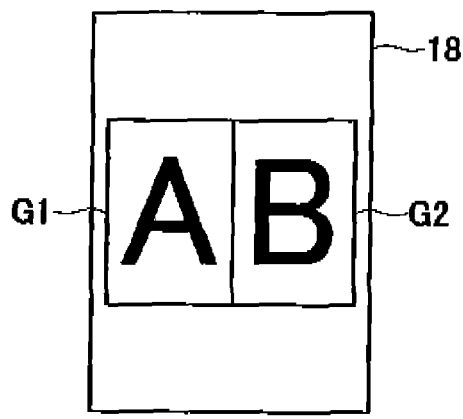
FIG. 11 is a view showing one example of an image layout.
Figure 13:
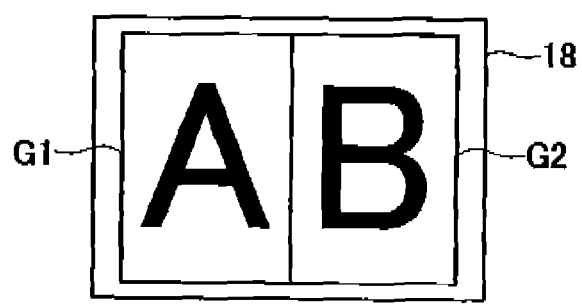
FIG. 13 is a view showing another example of the image layout.

At S320, the CPU 11 displays the selected image G1 and an associated image G2 on the panel 18 in a two-page spread layout. The associated image G2 is an image which is associated with the selected image G1 and whose page number follows or precedes that of the selected image G1. In other words, the page number of the selected image G1 is consecutive to that of the associated image G2. The two-page spread layout is a layout as shown in FIGS. 11 and 13 in which the selected image G1 and the associated image (32 are displayed on the panel 18 such that the selected image G1 is displayed as an image for one of the right and left pages while the associated image G2 is displayed as an image for the other of the right and left pages. It is noted that FIG. 11 shows one example of the display in which the selected image G1 and the associated image G2 are displayed in the two-page spread layout on the panel 18 being in the vertical orientation. FIG. 13 shows another example of the display in which the selected image G1 and the associated image G2 are displayed in the two-page spread layout on the panel 18 being in the horizontal orientation.

At S322, the CPU 11 judges whether the user has performed a displayed-page change operation which includes an operation to move forward the current page to the next page and an operation to move back the current page to the preceding page. For example, the user performs the displayed-page change operation by a flick operation on the panel 18. When the displayed-page change operation has not been performed (S322: NO), this flow repeats S322, and when the displayed-page change operation is performed (S322: YES), this flow goes to S324 at which the CPU 11 executes a displayed-page change processing. Specifically, when the CPU 11 moves forward the current page to the next page, the CPU 11 adds "2" to a current selected-image page number. When the CPU 11 moves back the current page to the preceding page, the CPU 11 subtracts "2" from the current selected-image page number. Upon completion of S324, this flow goes to S336.

Figure 12:
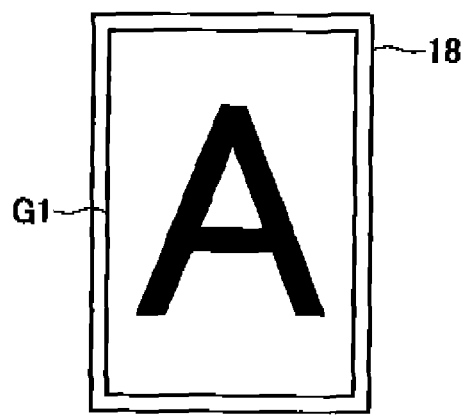
FIG. 12 is a view showing another example of the image layout.
Figure 14:
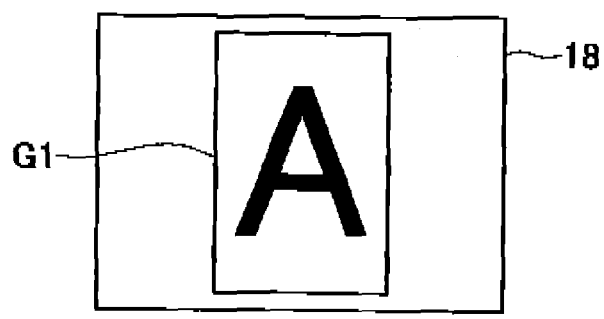
FIG. 14 is a view showing another example of the image layout.

On the other hand, when the CPU 11 at S316 judges that the selected image G1 being indicated by the selected-image page number is the front image, i.e., the front page, in the image file (S316: YES), this flow goes to S330. At S330, the CPU 11 displays only the selected image G1 on the panel 18 in the one page layout that differs from the two-page spread layout. The one page layout is a layout as shown in FIGS. 12 and 14 in which only the selected image G1 is displayed on the panel 18. A book is often designed such that a front cover, i.e., a front or first page, is in the one page layout and second and subsequent pages are in the two-page spread layout. In the present embodiment, the image of the front page is displayed in the one page layout, whereby the display layout of the images contained in the image file corresponds to the layout of the book. It is noted that FIG. 12 shows one example of the display in which the selected image G1 is displayed in the one page layout on the panel 18 being in the vertical orientation. FIG. 14 shows another example of the display in which the selected image G1 is displayed in the one page layout on the panel 18 being in the horizontal orientation.

At S332, the CPU 11 judges whether the user has performed the displayed-page change operation. When the displayed-page change operation has not been performed (S332: NO), this flow repeats S332, and when the displayed-page change operation is performed (S332: YES), this flow goes to S334 at which the CPU 11 executes the displayed-page change processing. Specifically, when the CPU 11 moves forward the current page to the next page, the CPU 11 adds "1" to the current selected-image page number. When the CPU 11 moves back the current page to the preceding page, the CPU 11 subtracts "1" from the current selected-image page number. Upon completion of S334, this flow goes to S336.

At S336, the CPU 11 judges whether the image file contains an image that corresponds to the selected-image page number changed by the displayed-page change operation. Where the image file contains the image of interest (S336: YES), this flow returns to S316, and where the image file does not contain the image of interest (S336: NO), this flow goes to S338. At S338, the CPU 11 displays a message "Front Page or Last Page" on the panel 18, and this flow ends.

On the other hand, where the CPU at S314 judges that the to-be-displayed image file is not the book file (S314: NO), this flow goes to S350 shown in FIG. 3. At S350, the CPU 11 judges whether the panel 18 of the mobile phone 10 is in the horizontal orientation. Specifically, the CPU 11 uses the API to obtain from the inclination sensor 29 sensor information indicative of an inclination of a housing of the mobile phone 10. The CPU 11 then judges, based on the sensor information, which of the horizontal direction and the direction perpendicular to the horizontal direction is nearer to a direction along the long sides of the panel 18. Where the panel 18 is in the horizontal orientation (S350: YES), this flow goes to S352.

At S352, the CPU 11 displays the selected image G1 and the associated image G2 in the two-page spread layout. In this case, as shown in FIG. 13, the selected image G1 and the associated image G2 are displayed on the panel 18 being in the horizontal orientation.

At S354, the CPU 11 judges whether the user has performed the displayed-page change operation. At S356, the CPU 11 executes the displayed-page change processing. It is noted that the processings in S354 and S356 are respectively similar to the above-described processings in S322 and S324, and an explanation thereof is omitted.

On the other hand, where the CPU 11 at S350 judges that the panel 18 is in the vertical orientation (S350: NO), this flow goes to S362. At S362, the CPU 11 displays only the selected image G1 in the one page layout. In this case, as shown in FIG. 12, only the selected image G1 is displayed on the panel 18 being in the vertical orientation. Also, since the selected image G1 is the portrait image, the selected image G1 can be displayed in larger size in the case where the selected image G1 is displayed on the panel 18 being in the vertical orientation as shown in FIG. 12 than in the case where the selected image G1 is displayed on the panel 18 being in the horizontal orientation as shown in FIG. 14. At S364, the CPU 11 judges whether the user has performed the displayed-page change operation. At S366, the CPU 11 executes the displayed-page change processing. It is noted that the processings in S364 and S366 are respectively similar to the above-described processings in S332 and S334, and an explanation thereof is omitted.

At S368, the CPU 11 judges whether the image file contains an image that corresponds to the selected-image page number changed by the displayed-page change operation. Where the image file contains the image of interest (S368: YES), this flow returns to S350, and where the image file does not contain the image of interest (S368: NO), this flow goes to S370. At S370, the CPU 11 displays the message "Front Page or Last Page" on the panel 18, and this flow ends, <Effects>

There will be next explained effects of the mobile phone 10 according to the first embodiment. In the mobile phone 10 according to the first embodiment, where the to-be-displayed image file is the book file (S314: YES), the selected image G1 and the associated image G2 are displayed at S320 on the panel 18 in the two-page spread layout as shown in FIG. 11. Also, where the to-be-displayed image file is not the book file (S314: NO), only the selected image G1 is displayed at S362 on the panel 18 in the one page layout as shown in FIG. 12. That is, the number of the images displayed on the panel 18 can be automatically changed depending upon whether the to-be-displayed image file is the book file. Therefore, the plurality of images can, be displayed on the panel 18 in such a layout that the user can view or recognize the images most easily, which enhances convenience for the user.

In the mobile phone 10 according to the first embodiment, the CPU at S416 judges whether the to-be-displayed image file is the book file, on the basis of the size of the document used for the creation of the images contained in the to-be-displayed image file. Therefore, the CPU 11 can judge whether the to-be-displayed image file is the book file by the simple processing.

In the mobile phone 10 according to the first embodiment, where the to-be-displayed image file is the book file (S314: YES), when the image of the front page is displayed (S316: YES), only the image of the front page is displayed at S330 an the panel 18 in the one page layout as shown in FIG. 12. Also, when the images of the second and subsequent pages are displayed (S316: NO), the selected image G1 and the associated image G2 are displayed at S320 on the panel 18 in the two-page spread layout as shown in FIG. 11. When the portrait image or images are displayed on the panel 18 being in the vertical orientation, each image can be displayed in larger size in the case where the one image is displayed in the one page layout as shown in FIG. 12 than in the case where the two images are displayed in the two-page spread layout as shown in FIG. 11. Therefore, the images can be displayed such that the image of the front page that is not displayed in the two-page spread layout is displayed in relatively large size and the images to be displayed in the two-page spread layout are displayed so as to be arranged side by side.

In the mobile phone 10 according to the first embodiment, even where the to-be-displayed image file is not the book file (S314: NO), where the panel 18 is in the horizontal orientation (S350: YES), the two images are displayed next to each other at S352 as shown in FIG. 13. Since the largest size of each image to be displayed is determined by the short sides of the panel 18 being in the horizontal orientation, when the portrait image or images are displayed on the panel 18 being in the horizontal orientation, a larger number of images having the same size can be displayed in the case where the two images are displayed as shown in FIG. 13 than in the case where the one image is displayed as shown in FIG. 14. This enables effective use of the display region of the panel 18.

In the mobile phone 10 according to the first embodiment, the CPU 11 at S414 uses the additional information attached to the image file to judge whether the to-be-displayed image file is the book file. Also, the CPU 11 at S410 judges whether the format of the image file is the format for the electronic book to judge whether the to-be-displayed image file is the book file. Therefore, the CPU 11 can judge whether the to-be-displayed image file is the book file by the simple processing.

Second Embodiment

Figure 6:
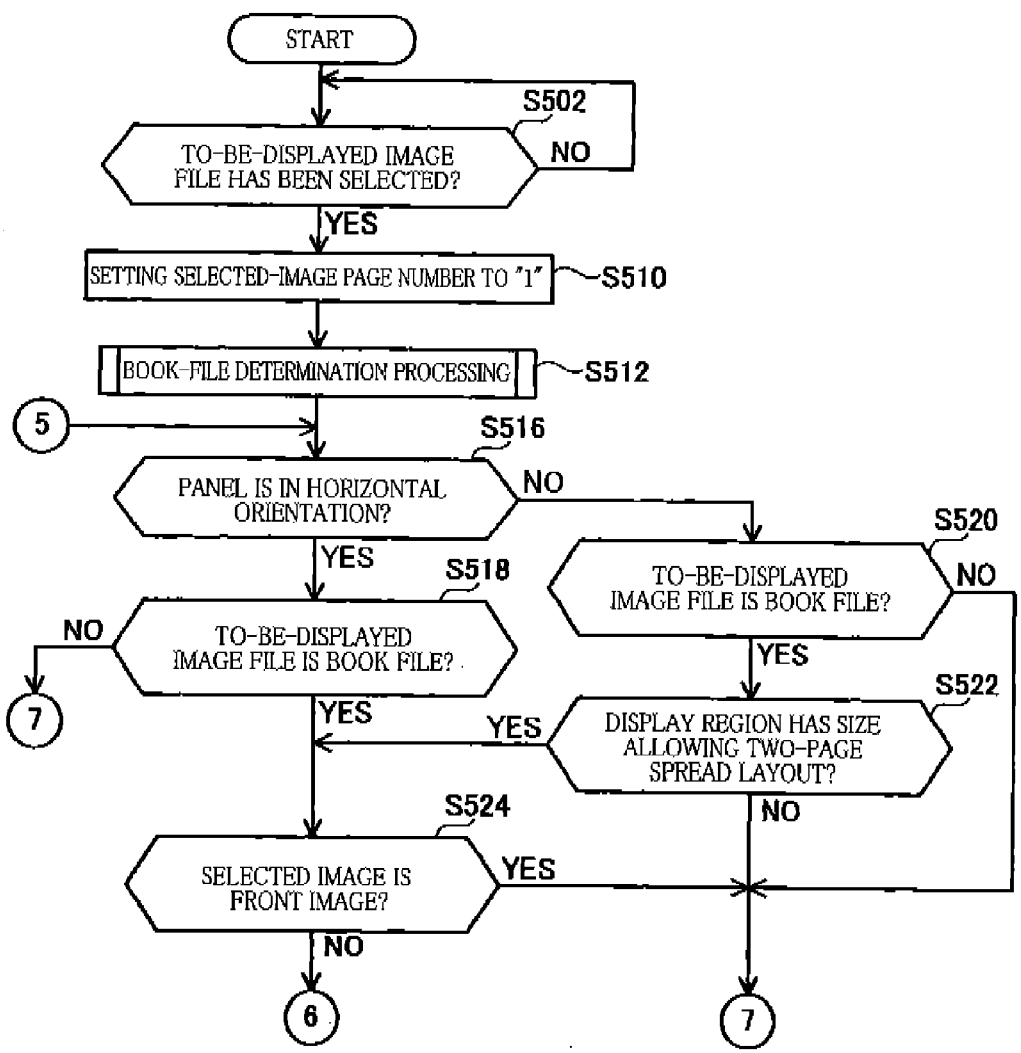
FIG. 6 is a flow chart showing operations of the mobile phone.
Figure 7:
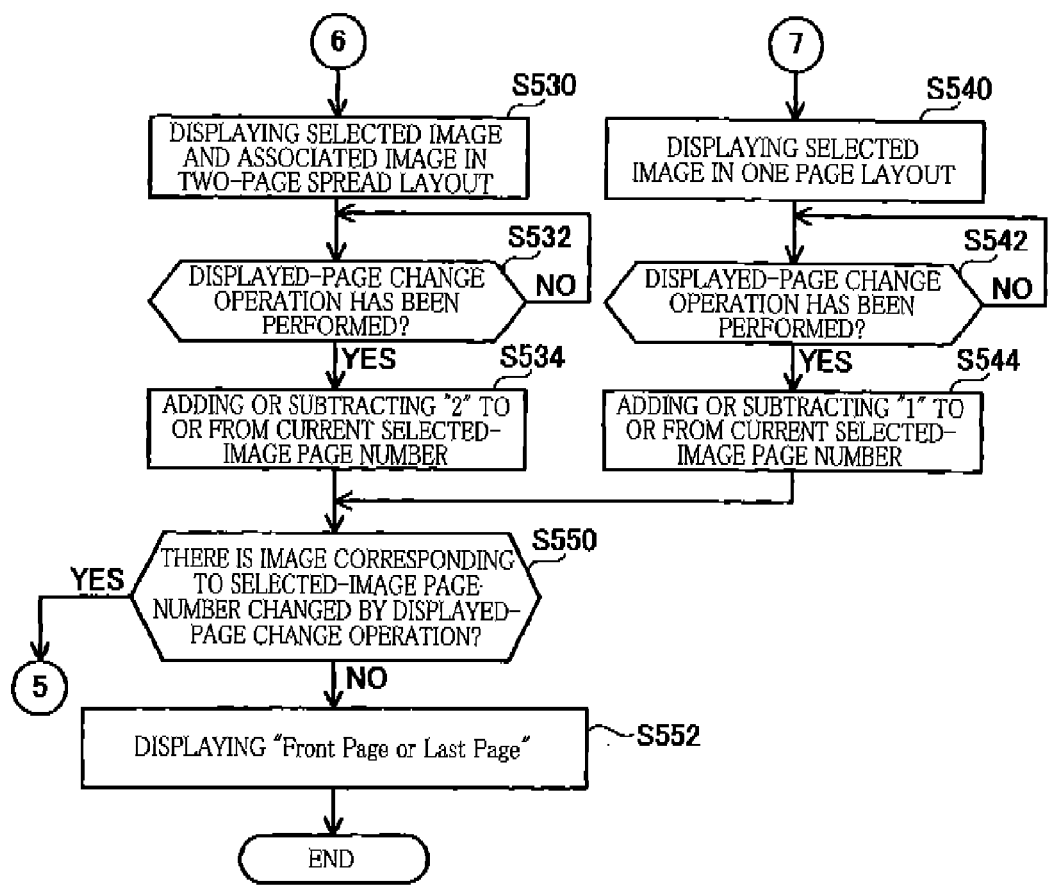
FIG. 7 is a flow chart showing operations of the mobile phone.

There will be next explained operations of the mobile phone 10 according to a second embodiment with reference to FIGS. 6 and 7. It is noted that the mobile phone 10 according to the second embodiment is similar in structure to the mobile phone 10 according to the first embodiment, and an explanation thereof is omitted.

At S502, the CPU 11 judges which of the plurality of image files stored in the image-file storage area 12b has been selected as the to-be-displayed image file. When the to-be-displayed image file has not been selected (S502: NO), this flow repeats S502, and when the to-be-displayed image file is selected (S502: YES), this flow goes to S510. At S510, the CPU 11 sets the selected-image page number to "1". At S512, the CPU 11 executes the book-file determination processing. It is noted that the book-file determination processing at S512 is similar to that in S312 in FIG. 4, and an explanation thereof is omitted.

At S516, the CPU 11 judges whether the panel 18 of the mobile phone 10 is in the horizontal orientation. Where the panel 18 is in the horizontal orientation (S516: YES), this flow goes to S518.

At S518, the CPU 11 judges based on the file-type flag whether the to-be-displayed image file is the book file. Where the to-be-displayed image file is not the book file (S518: NO), this flow goes to S540 in FIG. 7, and where the to-be-displayed image file is the book file (S518: YES), this flow goes to S524. At S524, the CPU 11 judges whether the selected image G1 being indicated by the selected-image page number is the front image, i.e., the front page, in the image file. Where the selected image G1 is the front image (S524: YES), this flow goes to S540 in FIG. 7, and where the selected image G1 is not the front image (S524: NO), this flow goes to S530 in FIG. 7.

At S530, the CPU 11 displays the selected image G1 and the associated image G2 in the two-page spread layout. At S532, the CPU 11 judges whether the user has performed the displayed-page change operation. At S534, the CPU 11 executes the displayed-page change processing. It is noted that the processings in S530, S532, and S534 are respectively similar to the above-described processings in S320, S322, and S324, and an explanation thereof is omitted.

At S550, the CPU 11 judges whether the image file contains an image that corresponds to the selected-image page number changed by the displayed-page change operation. Where the image file contains the image of interest (S550: YES), this flow returns to S516, and where the image file does not contain the image of interest (S550: NO), this flow goes to S552. At S552, the CPU 11 displays the message "Front Page or Last Page" on the panel 18, and this flow ends.

On the other hand, where the CPU 11 at S516 judges that the panel 18 is in the vertical orientation (S516: NO), this flow goes to S520. At S520, the CPU 11 judges based on the file-type flag whether the to-be-displayed image file is the book file. Where the to-be-displayed image file is not the book file (S520: NO), this flow goes to S540 in FIG. 7, and where the to-be-displayed image file is the book file (S520: YES), this flow goes to S522.

At S522, the CPU 11 judges whether the display region of the panel 18 has a size that allows two images to be displayed in the two-page spread layout. Specifically, where the size of the display region of the panel 18 is larger than a predetermined size, e.g., four inches, the CPU 11 judges that two images can be displayed in the two-page spread layout. Where the display region of the panel 18 has the size that allows the two-page spread layout (S522: YES), this flow goes to S524, and where the display region of the panel 18 does not have the size that allows the two-page spread layout (S522: NO), this flow goes to S540 in FIG. 7.

At S540, the CPU 11 displays only the selected image G1 in the one page layout. At S542, the CPU 11 judges whether the user has performed the displayed-page change operation. At S544, the CPU 11 executes the displayed-page change processing. Upon completion of S544, this flow goes to S550. It is noted that the processings in S540, S542, and S544 are respectively similar to the above-described processings in S330, S332, and S334, and an explanation thereof is omitted.

<Effects>

There will be next explained effects of the mobile phone 10 according to the second embodiment. In the mobile phone 10 according to the second embodiment, where the panel 18 of the mobile phone 10 is in the horizontal orientation (S516: YES), the selected image G1 and the associated image G2 are displayed at S530 on the panel 18 in the two-page spread layout as shown in FIG. 13. When the portrait image or images are displayed on the panel 18 being in the horizontal orientation, the display region can be used more effectively in the case where the two images are displayed as shown in FIG. 13 than in the case where the one image is displayed as shown in FIG. 14. Also where the panel 18 is in the vertical orientation (S516: NO), the selected image G1 is displayed at S540 on the panel 18 in the one page layout as shown in FIG. 12.

When the portrait image or images are displayed on the panel 18 being in the vertical orientation, each image can be displayed in larger size in the case where the one image is displayed as shown in FIG. 12 than in the case where the two images are displayed as shown in FIG. 11. That is, the number of the images displayed on the panel 18 can be automatically changed to a proper number depending upon the orientation of the panel 18. Therefore, the images can be displayed on the panel 18 depending upon the orientation of the panel 18 in such a layout that the user can view or recognize the images most easily, which enhances convenience for the user.

In the mobile phone 10 according to the second embodiment, where the panel 18 is in the vertical orientation (S516: NO) and where the display region of the panel 18 is larger than the predetermined size (S522: YES), it is possible to consider that the user can easily recognize the images even where the two images are arranged side by side. Accordingly, the selected image G1 and the associated image G2 can be displayed at S530 on the panel 18 in the two-page spread layout as shown in FIG. 11. This enables effective use of the display region of the panel 18.

In the mobile phone 10 according to the second embodiment, where the panel 18 is in the horizontal orientation (S516: YES) and where the to-be-displayed image file is the book file (S518: YES), the selected image G1 and the associated image G2 can be displayed at S530 on the panel 18 in the two-page spread layout as shown in FIG. 13. Also, where the panel 18 is in the horizontal orientation (S516: YES) and where the to-be-displayed image file is not the book file (S518: NO), the selected image G1 is displayed at S540 on the panel 18 in the one page layout as shown in FIG. 14. Therefore, the number of the images displayed on the panel 18 can be automatically changed depending upon whether the to-be-displayed image file is the book file.

Third Embodiment

Figure 8:
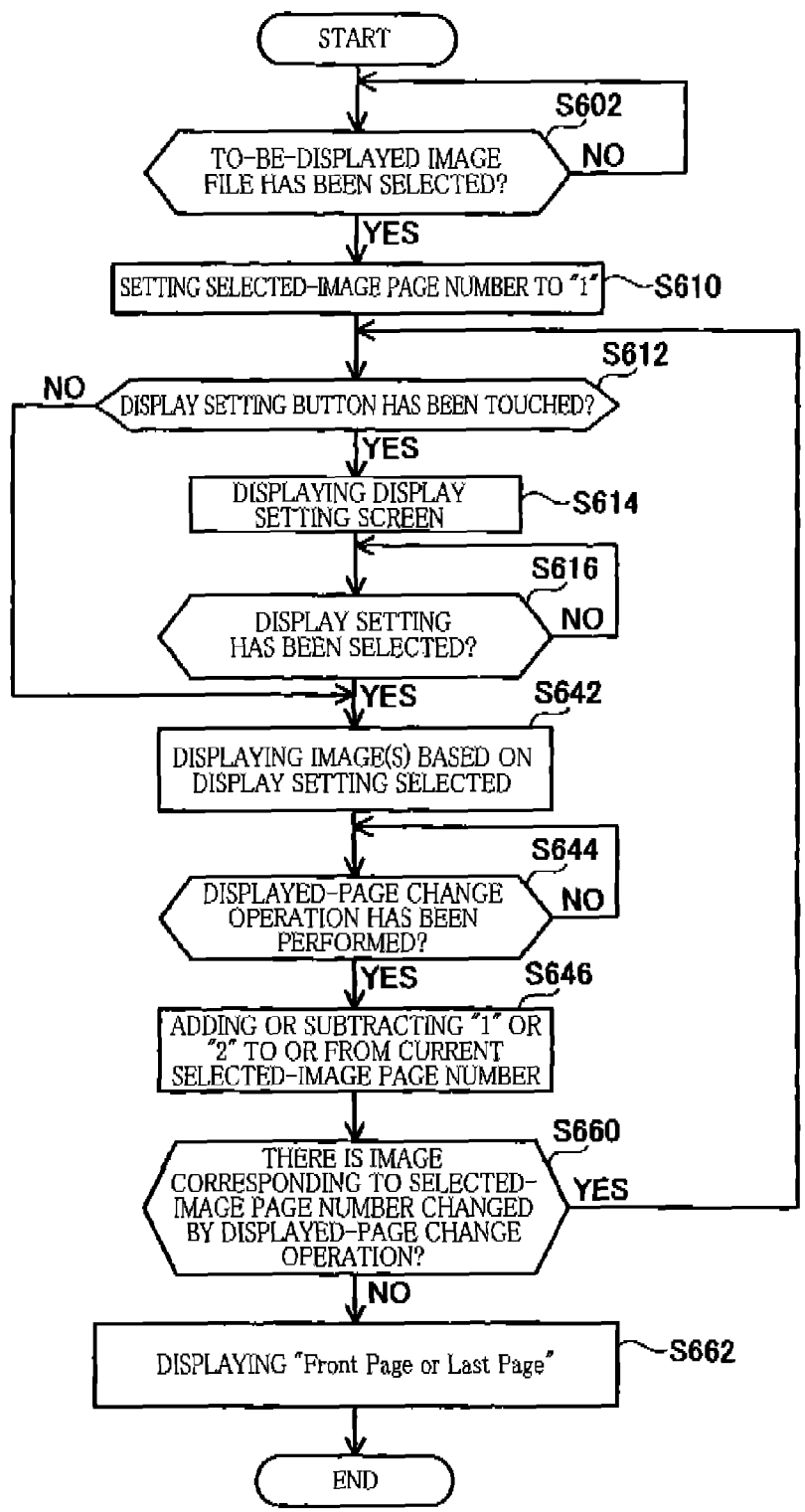
FIG. 8 is a flow chart showing operations of the mobile phone.

There will be next explained operations of the mobile phone 10 according to a third embodiment with reference to FIG. 8. It is noted that the mobile phone 10 according to the third embodiment is similar in structure to the mobile phone 10 according to the first embodiment, and an explanation thereof is omitted.

At S602, the CPU 11 judges which of the plurality of image files stored in the image-file storage area 12b has been selected as the to-be-displayed image file. When the to-be-displayed image file has not been selected (S602: NO), this flow repeats S602, and when the to-be-displayed image file is selected (S602: YES), this flow goes to S610. At S610, the CPU 11 sets the selected-image page number to "1".

At S612, the CPU 11 judges whether the user has touched a display setting button. The display setting button is a button which is touched by the user to set or change the display setting. When the user has not touched the display setting button (S612: NO), this flow goes to S642, and when the user touches the display setting button (S612: YES), this flow goes to S614. At S614, the CPU 11 displays a display setting screen on the panel 18. The display setting as described above includes the one page layout, the right-binding two-page-spread layout, and the left-binding two-page-spread layout, and texts or icons representative of these layouts are displayed on the display setting screen. At S616, the CPU 11 judges whether the user has selected the display setting, i.e., one of the three layouts. When the display setting has not been selected (S616: NO), this flow repeats S616, and when the display setting is selected (S616: YES), this flow goes to S642.

At S642, the CPU 11 displays the image or images based on the display setting selected in S616. When the one page layout is selected, only the selected image G1 is displayed on the panel 18. When the right-binding two-page-spread layout is selected, the selected image G1 and the associated image G2 are displayed on the panel 18 in the two-page spread layout. In this layout, one of the selected image G1 and the associated image G2 which one has a smaller page number than that of the other is displayed on a right side or a right portion of the display region while the other image having a larger page number is displayed on a left side or a left portion of the display region. When the left-binding two-page-spread layout is selected, the selected image G1 and the associated image G2 are displayed on the panel 18 in the two-page spread layout. In this layout, one of the selected image G1 and the associated image G2 which one has a smaller page number than that of the other is displayed on the left side while the other image having a larger page number is displayed on the right side. It is noted that, when the user has not touched the display setting button (S612: NO), the CPU 11 may display the images using a setting that has been most recently used or a setting that has been set by the user in advance, for example.

At S644, the CPU 11 judges whether the user has performed the displayed-page image operation. It is noted that the processing in S644 is similar to the above-described processing in S322, and an explanation thereof is omitted.

At S646, the CPU 11 executes the displayed-page change processing. Specifically, where the right-binding two-page-spread layout or the left-binding two-page-spread layout is being selected, the CPU 11 adds or subtracts "2" to or from the current selected-image page number. Where the one page layout is being selected, the CPU 11 adds or subtracts "1" to or from the current selected-image page number.

At S660, the CPU 11 judges whether the image file contains an image that corresponds to the selected-image page number changed by the displayed-page change operation. Where the image file contains the image of interest (S660: YES), this flow returns to S612, and where the image file does not contain the image of interest (S660: NO), this flow goes to S662. At S662, the CPU 11 displays the message "Front Page or Last Page" on the panel 18, and this flow ends.

<Effects>

In the mobile phone 10 according to the third embodiment, the user can set or change the display setting as appropriate depending upon, for example, a case where the images contain texts written vertically or a case where the images contain texts written horizontally, which enhances convenience for the user.

Fourth Embodiment

Figure 9:
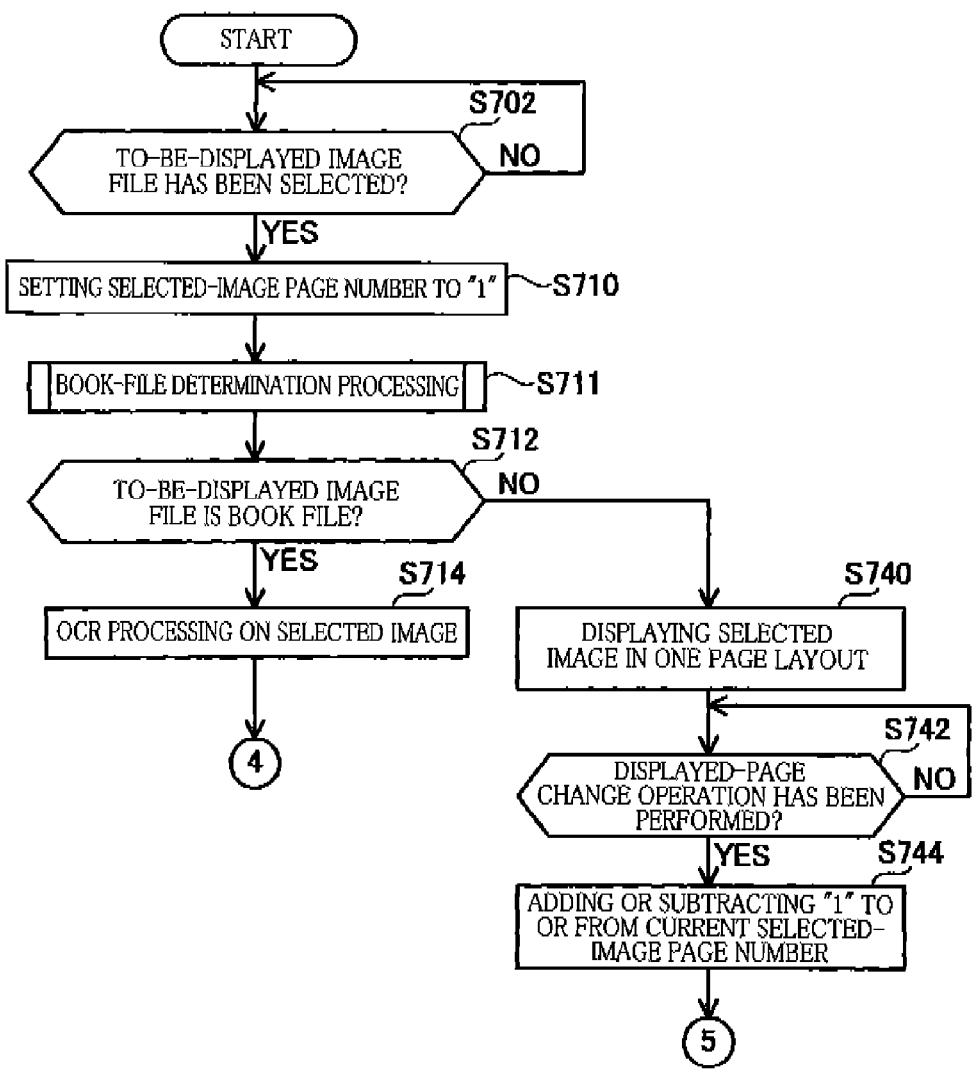
FIG. 9 is a flow chart showing operations of the mobile phone.
Figure 10:
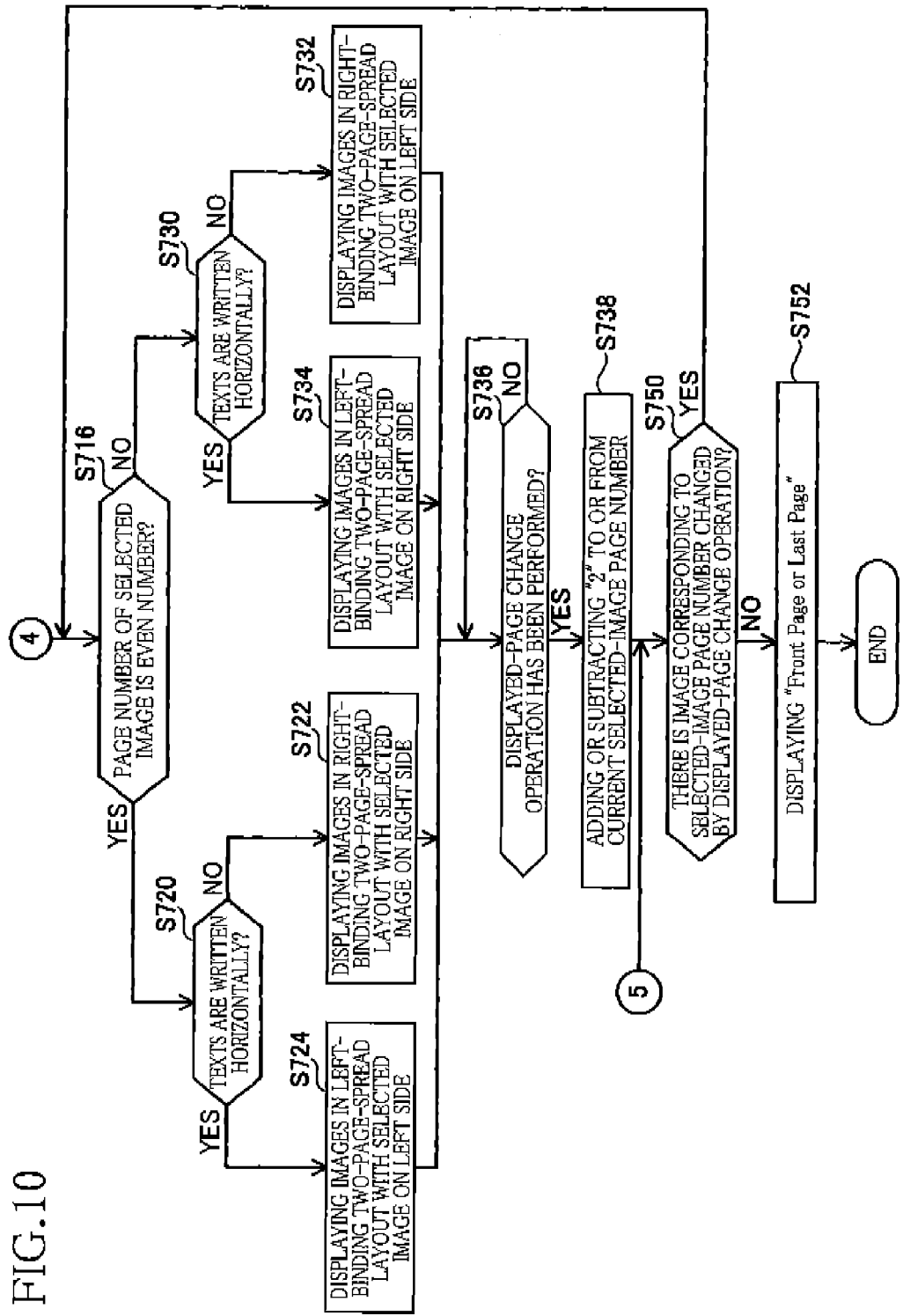
FIG. 10 is a flow chart showing operations of the mobile phone.

There will be next explained operations of the mobile phone 10 according to a fourth embodiment with reference to FIGS. 9 and 10. It is noted that the mobile phone 10 according to the fourth embodiment is similar in structure to the mobile phone 10 according to the first embodiment, and an explanation thereof is omitted.

At S702, the CPU 11 judges which of the plurality of image files stored in the image-file storage area 12b has been selected as the to-be-displayed image file. When the to-be-displayed image file has not been selected (S702: NO), this flow repeats S702, and when the to-be-displayed image file is selected (S702: YES), this flow goes to S710. At S710, the CPU 11 sets the selected-image page number to "1". At S711, the CPU 11 executes the book-file determination processing.

Figure 4:
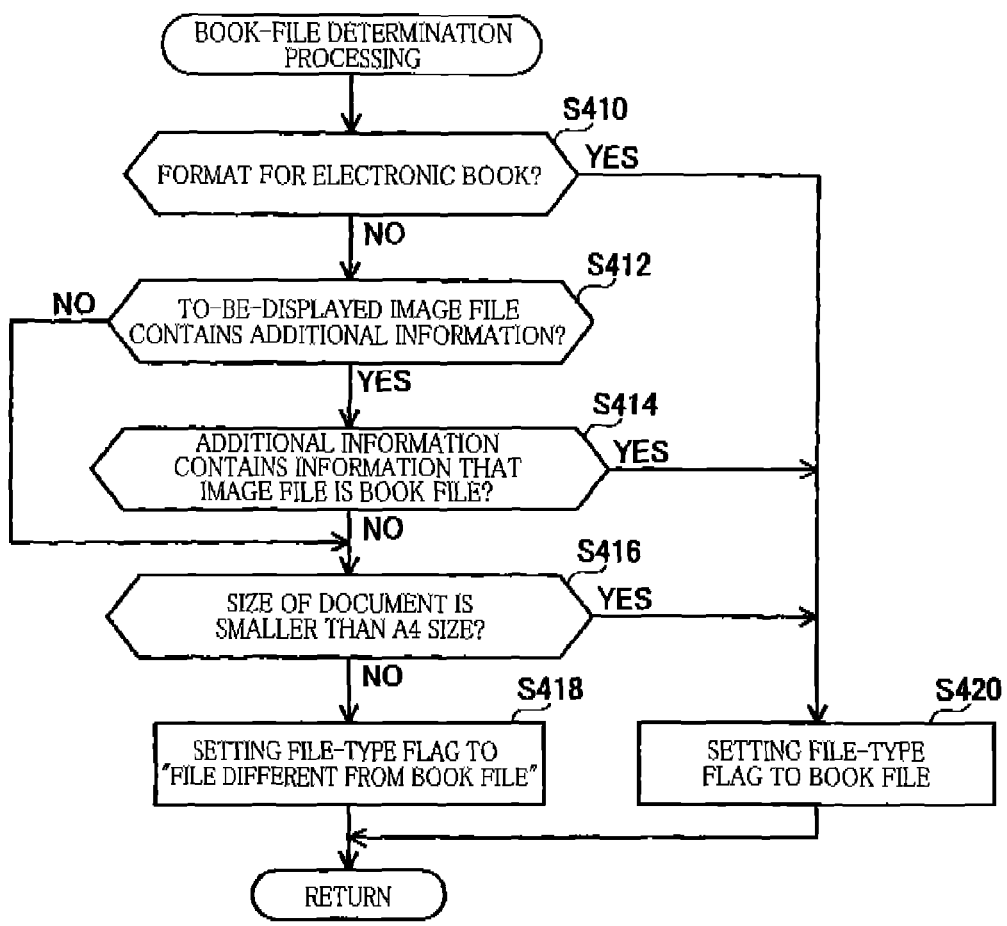
FIG. 4 is a flow chart showing operations of the mobile phone.

It is noted that the book-file determination processing at S711 is similar to that in S312 in FIG. 4, and an explanation thereof is omitted.

At S712, the CPU 11 judges based on the file-type flag whether the to-be-displayed image file is the book file. Where the to-be-displayed image file is not the book file (S712: NO), this flow goes to S740 at which the CPU 11 displays only the selected image G1 in the one page layout. At S742, the CPU 11 judges whether the user has performed the displayed-page change operation. At S744, the CPU 11 executes the displayed-page change processing. Upon completion of S744, this flow goes to S750. It is noted that the processings in S740, S742, and S744 are respectively similar to the above-described processings in S330, S332, and S334, and an explanation thereof is omitted.

On the other hand, where the to-be-displayed image file is the book file (S712: YES), this flow goes to S714. At S714, the CPU 11 executes an optical character recognition processing (hereinafter referred to as "OCR processing") on the selected image G1 being indicated by the selected-image page number. In this OCR processing, it is recognized that texts contained in the selected image G1 are written vertically or horizontally. In other words, it is recognized that a direction of arrangement of the texts is the vertical direction or horizontal direction. In the OCR processing, the page number displayed on the selected image G1 is also recognized. It is noted that this OCR processing uses a common method and an explanation thereof is omitted.

At S716 in FIG. 10, the CPU 11 judges whether the page number of the selected image G1 recognized in the OCR processing is an even number. Where the page number of the selected image G1 is an even number (S716: YES), this flow goes to S720. At S720, the CPU 11 judges, based on a result of the OCR processing, whether the texts contained in the selected image G1 are written horizontally. Where the texts are written vertically (S720: NO), this flow goes to S722.

At S722, the CPU 11 displays the selected image G1 and the associated image G2 on the panel 18 in the right-binding two-page-spread layout. In this layout, one of the selected image G1 and the associated image G2 which one has a smaller page number than that of the other image is located on a right side of the other image.

Here, there will be explained one example of how the CPU 11 judges which of the selected image G1 and the associated image G2 is larger or smaller in the page number. Since a book is often designed such that the front page is a front cover and the second and subsequent pages are in the two-page spread layout, the CPU 11 may judge that an even-number page of the two pages in the two-page spread layout has a smaller page number, and an odd-number page has a larger page number.

Thus, the CPU 11 at S722 may display the selected image G1 and the associated image G2 such that the selected image G1 of the even-number page having the smaller page number is displayed on the right side while the associated image G2 of the odd-number page having the larger page number is displayed on the left side.

When the CPU 11 at S720 judges that the texts are written horizontally (S720: YES), this flow goes to S724. At S724, the CPU 11 displays the selected image G1 and the associated image G2 on the panel 18 in the left-binding two-page-spread layout. In this layout, one of the selected image G1 and the associated image G2 which one has a smaller page number than that of the other image is located on a left side of the other image. Specifically, the CPU 11 displays the selected image G1 and the associated image G2 such that the selected image G1 of the even-number page having the smaller page number is displayed on the left side while the associated image G2 of the odd-number page having the larger page number is displayed on the right side.

On the other hand, when the CPU 11 at S716 judges that the page number of the selected image G1 recognized in the OCR processing is an odd number (S716: NO), this flow goes to S730. At S730, the CPU 11 judges, based on the result of the OCR processing, whether the texts contained in the selected image G1 are written horizontally. Where the texts are written vertically (S730: NO), this flow goes to S732.

At S732, the CPU 11 displays the selected image G1 and the associated image G2 on the panel 18 in the right-binding two-page-spread layout. In this layout, one of the selected image G1 and the associated image G2 which one has a smaller page number than that of the other image is located on a right side of the other image. Specifically, the CPU 11 displays the selected image G1 and the associated image G2 such that the associated image G2 of the even-number page having the smaller page number is displayed on the right side while the selected image G1 of the odd-number page having the larger page number is displayed on the left side.

On the other hand, when the CPU 11 at S730 judges that the texts are written horizontally (S730: YES), this flow goes to S734. At S734, the CPU 11 displays the selected image G1 and the associated image G2 on the panel 18 in the left-binding two-page-spread layout. In this layout, one of the selected image G1 and the associated image G2 which one has a smaller page number than that of the other image is located on a left side of the other image. Specifically, the CPU 11 displays the selected image G1 and the associated image G2 such that the associated image G2 of the even-number page having the smaller page number is displayed on the left side while the selected image G1 of the odd-number page having the larger page number is displayed on the right side.

At S736, the CPU 11 judges whether the user has performed the displayed-page change operation. At S738, the CPU 11 executes the displayed-page change processing. It is noted that the processings in S736 and S738 are respectively similar to the above-described processings in S322 and S324, and an explanation thereof is omitted.

At S750, the CPU 11 judges whether the image file contains an image that corresponds to the selected-image page number changed by the displayed-page change operation. Where the image file contains the image of interest (S750: YES), this flow returns to S716, and where the image file does not contain the image of interest (S750: NO), this flow goes to S752. At S752, the CPU 11 displays the message "Front Page or Last Page" on the panel 18, and this flow ends.

<Effects>

In the mobile phone 10 according to the fourth embodiment, when displayed in the two-page spread layout, the two images are displayed selectively in one of the right-binding two-page-spread layout and the left-binding two-page-spread layout depending upon whether the texts contained in the images based on the image data are written vertically or horizontally. Therefore, the images can be displayed in the two-page spread layout so as to suit the vertically-written document or the horizontally-written document.

In the mobile phone 10 according to the fourth embodiment, when displayed in the two-page spread layout, the two images are displayed selectively in one of the right-binding two-page-spread layout and the left-binding two-page-spread layout depending upon whether the page number displayed on the image is the even number or the odd number. Therefore, the images can be displayed in the two-page spread layout so as to suit the vertically-written document or the horizontally-written document.

While the embodiments of the present invention has been described above, it is to be understood that the invention is not limited to the details of the illustrated embodiments, but may be embodied with various changes and modifications, which may occur to those skilled in the art, without departing from the spirit and scope of the invention. There will be explained modifications of the above-described embodiments.

<Modifications>

While the sequential page numbers are respectively assigned to the images based on the plurality of image data in the above-described embodiments, the present invention is not limited to this configuration. For example, the page numbers may be respectively assigned to the plurality of image data. Also, an order of the page numbers assigned to the respective image data may be different from that of the plurality of images to be displayed. Also, data representative of the page numbers assigned to the image data may be stored in the image file, for example.

While the CPU 11 at S416 judges whether the size of the document used for the creation of the images is equal to or smaller than the A4 size for the front image or the front page in the image file in the above-described embodiment, the present invention is not limited to this configuration. For example, this processing may be executed for any of the second or subsequent images in the image file or alternatively for a plurality of the images.

The size to be compared with the size of the document used for the creation of the image at S416 is not limited to the A4 size and may be various sizes such as B5 size and A6 size.

Various methods can be employed for judging, at S722, S724, S732, and S734, which of the images to be displayed in the two-page spread layout is smaller in the page number. For example, the CPU 11 may instruct the user to select whether the front image or the front page in the to-be-displayed image file is an image of the front cover. This selection may be performed, for example, in the selection of the to-be-displayed image file at S302. Where the front image or the front page is the image of the front cover, the second and subsequent pages are to be displayed in the two-page spread layout. Thus, the CPU 11 may judge that the even-number page is the smaller page number. On the other hand, where the front image or the front page is not the image of the front cover, the front page and subsequent pages are to be displayed in the two-page spread layout. Thus, the CPU 11 may judge that the odd-number page is the smaller page number.

Figure 3:
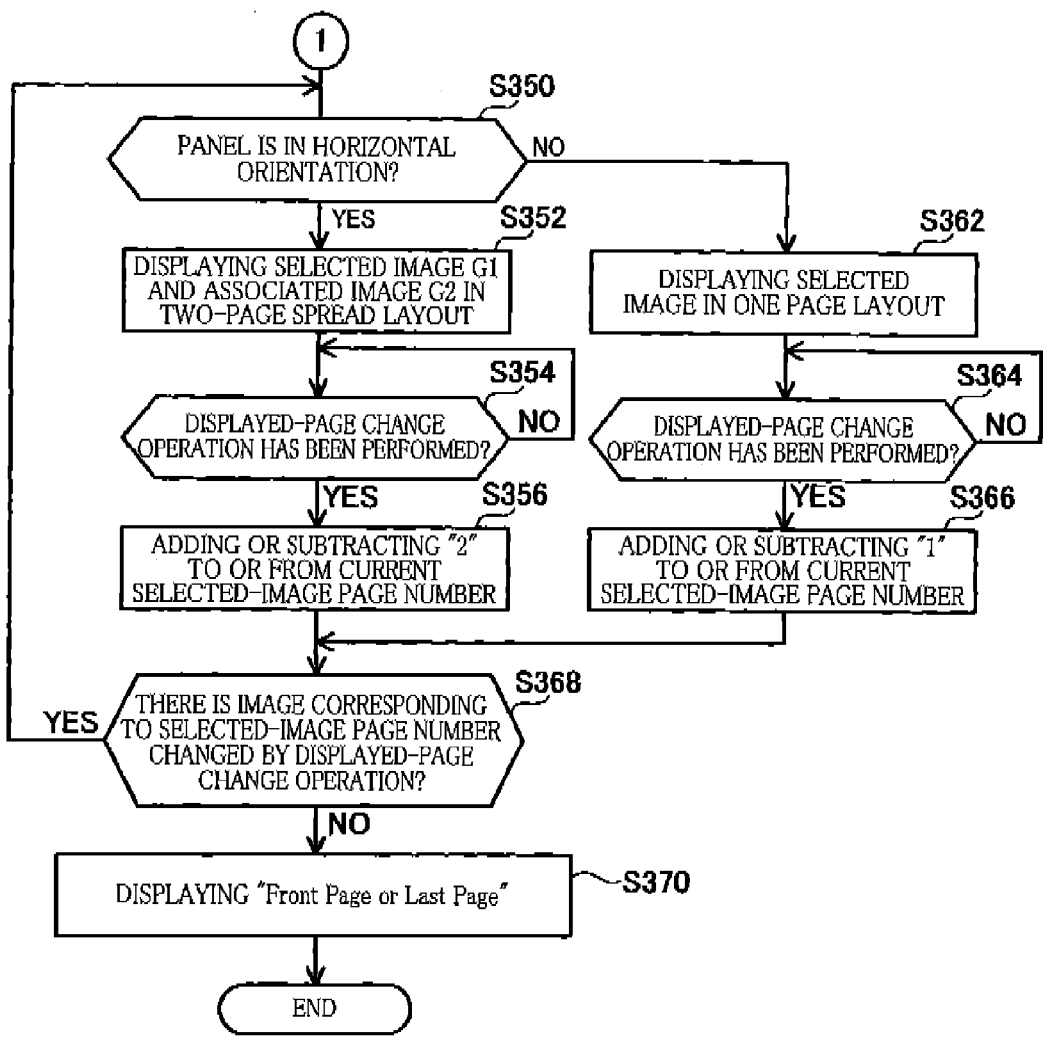
FIG. 3 is a flow chart showing operations of the mobile phone.

The processing in S350 may be omitted from the flow chart in FIG. 3. In this case, where the to-be-displayed image file is not the book file (S314: NO), the processing may go to S362 at which the CPU 11 displays only the selected image G1 in the one page layout.

The images based on the image data contained in the image file are not limited to the portrait image and may be the landscape image.

The method for obtaining the image file is not limited to the method for the receipt from the MFP 51 and may be various methods. For example, the image file may be obtained from a non-transitory memory installed in a memory slot, not shown.

Also, the processing in S316 may be omitted from the flow chart in FIG. 2. In this case, where the to-be-displayed image file is the book file (S314: YES), the CPU 11 at S320 displays the selected image G1 and the associated image G2 on the panel 18 in the two-page spread layout. Also, the processings in S518 and S524 may be omitted from the flow chart in FIG. 6. In this case, where the panel 18 is in the horizontal orientation (S516: YES), the CPU 11 at S530 displays the selected image G1 and the associated image G2 on the panel 18 in the two-page spread layout.

Also, the present invention is applicable not only to the mobile phone 10 but also to other devices such as notebook computers and tablet devices.

The buttons, e.g., for selecting the viewer application 21a and for selecting the to-be-displayed image file are not limited to be displayed on the touch panel of the panel 18. For example, these buttons may be constituted by hard keys of the mobile phone 10.

While the CPU 11 operating according to the viewer application 21a executes the various processings in the above-described embodiments, the present invention is not limited to this configuration. The CPU 11 operating according to the viewer application 21a may command the operating system 21e, other programs, and/or hardware such as the panel 18 to execute various processings.

The technological elements described in the present specification or the drawings exhibit technological utility individually or in various combinations and are not limited to the combinations disclosed in the claims at the time of application. Furthermore, the technology illustrated in the present specification or the drawings may simultaneously achieve a plurality of objects, and have technological utility by achieving one of these objects.

The mobile phone 10 is one example of a mobile terminal: The panel 18 is one example of a display. The CPU 11 is one example of a computer. The viewer application 21a is one example of a program. The CPU 11 executing the processings such as S530 and S540 is one example of a display controller and a display control step. The inclination sensor 29 is one example of a sensor-information output unit. The image file is one example of an image data set. The selected image is one example of a first image. The associated image is one example of a second image. The one page layout is one example of a layout that differs from the two-page spread layout.

It is noted that each program may be constituted by a single program module or a plurality of program modules. Each of the above-described examples may be in other forms as long as the similar function is exhibited. For example, each example may be: a computer (e.g., the CPU 11) configured to execute a processing according to an image processing program (e.g., the viewer application 21a); a computer (e.g., the operating system and other applications) configured to execute a processing according to programs other than the image processing program; hardware (e.g., the panel 18) that is operated according to the command of the computer; and a configuration including both of the computer and the hardware. It should be noted that each of the above-described examples may be: a computer configured to execute processings by executing processings according to a plurality of programs together with one another; and hardware that is operated according to a command of the computer configured to execute the processing by executing the processings according to the plurality of programs together with one another.

What is claimed is:

1. A non-transitory storage medium storing a program to be executed by a computer of a mobile terminal comprising: a storage configured to store an image data set containing a plurality of image data to which order numbers are respectively assigned in order; and a display configured to display thereon at least one image of a plurality of images respectively based on the plurality of image data, wherein the program is designed to cause the computer to function as a display controller configured to control the display to display a first image based on image data that is a selected one of the plurality of image data contained in the image data set, and wherein the display controller is configured to:

extract book-file information from the image data set stored in the storage, the book-file information indicating a plurality of images respectively based on the plurality of image data have a two-page-spread relationship in which consecutive two of the plurality of images constitute a pair of right and left pages on the display;

determine whether the plurality of images have the two-page-spread relationship o the basis of the extracted book-file information;

when it is determined that the plurality of images the two-page-spread relationship, control the display to display the first image and a second image consecutive to the first image in a two-page spread layout in which the first image and the second image are arranged respectively on one and the other of the right and left pages; and when it is determined that the plurality a images do not have the two-page-spread relationship, control the display to display the first image in a layout that differs from the two-page spread layout.

2. The storage medium according to claim 1, wherein the plurality of image data are respectively representative of a plurality of consecutive pages.

3. The storage medium according to claim 2, wherein the display controller is configured, where the plurality of images respectively based on the plurality of image data contained in the image data set have the two-page-spread relationship and where the first image is one of the plurality of images which represents a front page, to control the display to display the first image in a layout that differs from the two-page spread layout and to display the second image and a third image that is consecutive to the second image and different from the first image, in the two-page spread layout in which the second image and the third image are arranged respectively on the one and the other of the right and left pages.

4. The storage medium according to claim 1, wherein the display controller is configured, where a size of an image based on each of at least one of the plurality of image data contained in the image data set is equal to or smaller than a predetermined size, to determine that the plurality of images respectively based on the plurality of image data contained in the image data set have the two-page-spread relationship.

5. The storage medium according to claim 1, wherein the display controller is configured to extract additional information attached to the image data set as the book-file information, and wherein the display controller is configured, where the extracted additional information read by the display controller is a specific information, to determine that the plurality of images respectively based on the plurality of image data contained in the image data set have the two-page-spread relationship.

6. The storage medium according to claim 1, wherein the display controller is configured to extracted a format of the image data set as the book-file information, wherein the display controller is configured, where the extracted format of the image data set is a format associated with an electronic book, to determine that the plurality of images respectively based on the plurality of image data contained in the image data set have the two-page-spread relationship.

7. The storage medium according to claim 1,
wherein the mobile terminal further comprises a sensor-information output unit configured to output sensor information indicative of an orientation of the mobile terminal,
wherein the display is a rectangular display having short sides and long sides, and
wherein the display controller is configured to:
  where the sensor information indicates that a direction in which the short sides of the display extend is nearer to a horizontal direction than to a vertical direction and where a size, of a display region of the display is greater than a predetermined value, control the display to display the first image and the second image; and
  where the sensor information indicates that the direction in which the short sides of the display extend is nearer to the horizontal direction than to the vertical direction and where the size of the display region of the display is equal to or less than the predetermined value, control the display to display the first image.

8. A method for controlling a mobile terminal comprising: a storage configured to store an image data set containing a plurality of image data to which order numbers are respectively assigned in order; and a display configured to display thereon at least one image of a plurality of images respectively based on the plurality of image data,
wherein the method comprises a display control step of controlling the display to display a first image based on image data that is a selected one of the plurality of image data contained in the image data set, and
wherein the display control step comprises:
  extracting book-file information from the image data set stored in the storage, the book-file information indicating a plurality of images respectively based on the plurality of image data have a two-page-spread relationship in which consecutive two of the plurality of images constitute a pair of right and left pages on the display;
  determining whether the plurality of images have the two-page-spread relationship on the basis of the extracted book-file information;
  when it is determined that the plurality of images have the two-page-spread relationship, controlling the display to display the first image and a second image consecutive to the first image in a two-page spread layout in which the first image and the second image are arranged respectively on one and the other of the right and left pages; and
  when it is determined that the plurality of images do not have the two-page-spread relationship, controlling the display to display the first image in a layout that differs from the two-page spread layout.

9. A mobile terminal, comprising:
a storage configured to store an image data set containing a plurality of image data to which order numbers are respectively assigned in order;
a display configured to display thereon at least one image of a plurality of images respectively based on the plurality of image data and a display controller configured to control the display to display a first image based on image data that is a selected one of the plurality of image data contained in the image data set,
wherein the display controller is configured to:
  extract book-file information from the image data set stored in the storage, the book-file information indicating a plurality of images respectively based on the plurality of image data have a two-page-spread relationship in which consecutive two of the plurality of images constitute a pair of right and left pages on the display;
  determine whether the plurality of images have the two-page-spread relationship on the basis of the extracted book-file information;
  when it is determined that the plurality of images have the two-page-spread relationship, control the display to display the first image and a second image consecutive to the first image in a two-page spread layout in which the first image and the second image are arranged respectively on one and the other of the right and left pages; and
  when it is determined that the plurality of images do not have the two-page-spread relationship, control the display to display the first image in a layout that differs from the two-page spread layout.

10. A non-transitory storage medium storing a program to be executed by a computer of a mobile terminal comprising: a storage configures to store an image data set containing a plurality of image data to which order numbers are respectively assigned in order; and a display configured to display thereon at least one image of a plurality of images respectively based on the plurality of image data,
wherein the program is designed to cause the computer to function as a display controller configured to control the display to display a first image based on image data that is a selected one of the plurality of image data contained in the image data set,
wherein the display controller is configured to:
where a plurality of images respectively based on the plurality of image data contained in the image data set have a two-page-spread relationship in which consecutive two of the plurality of images constitute a pair of right and left pages, control the display to display the first image and a second image consecutive to the first image in a two-page spread layout in which the first image and the second image are arranged respectively on one and the other of the right and left pages; and
where the plurality of images respectively based on the plurality of image data contained in the image data set do not have the two-page-spread relationship, control the display to display the first image in a layout that differs from the two-page spread layout,
wherein the plurality of image data are respectively representative of a plurality of consecutive pages,
wherein the mobile terminal further comprises a sensor-information output unit configured to output sensor information indicative of an orientation of the mobile terminal with respect to a first direction and a second direction that is perpendicular to the first direction,
wherein each of the plurality of images respectively based on the plurality of image data is a portrait image,
wherein the display is a rectangular display having short sides and long sides, and
wherein the display controller is configured to:
where the sensor information indicates that a direction in which the long sides of the display extend is nearer to the second direction than to the first direction, control the display to display the first image and the second image in the two-page spread layout regardless of whether the plurality of images respectively based on the plurality of image data contained in the image data set have the two-page-spread relationship;
where the sensor information indicates that the direction in which the long sides of the display extend is nearer to the first direction than to the second direction and where the plurality of images respectively based on the plurality of image data contained in the image data set have the two-page-spread relationship, control the display to display the first image and the second image in the two-page spread layout in which the first image and the second image are arranged respectively on the one and the other of the right and left pages; and where the sensor information indicates that the direction in which the long sides of the display extend is nearer to the first direction than to the second direction and where the plurality of images respectively based on the plurality of image data contained in the image data set do not have the two-page-spread relationship, control the display to display the first image in a layout that differs from the two-page spread layout.

11. A non-transitory storage medium storing a program to be executed by a computer of a mobile terminal comprising: a storage configures to store an image data set containing a plurality of image data to which order numbers are respectively assigned in order; and a display configured to display thereon at least one image of a plurality of images respectively based on the plurality of image data, wherein the program is designed to cause the computer to function as a display controller configured to control the display to display a first image based on image data that is a selected one of the plurality of image data contained in the image data set, wherein the display controller is configured to:

where a plurality of images respectively based on the plurality of image data contained in the image data set have a two-page-spread relationship in which consecutive two of the plurality of images constitute a pair of right and left pages, control the display to display the first image and a second image consecutive to the first image in a two-page spread layout in which the first image and the second image are arranged respectively on one and the other of the right and left pages; and where the plurality of images respectively based on the plurality of image data contained in the image data set do not have the two-page-spread relationship, control the display to display the first image in a layout that differs from the two-page spread layout, wherein, where the plurality of images respectively based on the plurality of image data contained in the image data set have a two-page-spread relationship, the display controller is configured to:

where a direction of arrangement of text contained in an image based on each of at least one of the plurality of image data contained in the image data set coincides with a horizontal direction of the image based on each of the at least one of the plurality of image data, control the display to display the first image and the second image in a layout in which one of the first image and the second image which one has a smaller order number than that of the other of the first image and the second image is located on a left side of the other of the first image and the second image; and where the direction of the arrangement of the text coincides with a vertical direction of the image based on each of the at least one of the plurality of image data, control the display to display the first image and the second image in a layout in which one of the first image and the second image which one has a smaller order number than that of the other of the first image and the second image is located on a right side of the other of the first image and the second image.

12. The storage medium according to claim 11, wherein the display controller is configured to:

where a page number of the first image is an even number and where the direction of the arrangement of the text coincides with, the horizontal direction of the image based on each of the at least one of the plurality of image data, control the display to display the first image and the second image that has a page number following that of the first image in a layout in which the first image is located on a left side of the second image;

where the page number of the first image is an even number and where the direction of the arrangement of the text coincides with the vertical direction of the image based on each of the at least one of the plurality of image data, control the display to display the first image and the second image that has a page number following that of the first image in a layout in which the first image is located on a right side of the second image;

where the page number of the first image is an odd number and where the direction of the arrangement of the text coincides with the horizontal direction of the image based on each of the at least one of the plurality of image data, control the display to display the first image and the second image that has a page number preceding that of the first image in a layout in which the first image is located on a right side of the second image; and where the page number of the first image is an odd number and where the direction of the arrangement of the text coincides with the vertical direction of the image based on each of the at least one of the plurality of image data, control the display to display the first image and the second image that has a page number preceding that of the first image in a layout in which the first image is located on a left side of the second image.

* * * * *